United States Patent [19]

Bard et al.

[11] Patent Number: 5,578,810
[45] Date of Patent: *Nov. 26, 1996

[54] RING MOUNTED MINIATURE OPTICAL SCANNER

[75] Inventors: Simon Bard; Boris Metlitsky, both of Stony Brook; Mark Krichever, Hauppauge; Jerome Swartz, Old Field, all of N.Y.

[73] Assignee: Symbol Technologies, Inc., Bohemia, N.Y.

[*] Notice: The term of this patent shall not extend beyond the expiration date of Pat. No. 5,410,140.

[21] Appl. No.: 416,128

[22] Filed: Apr. 3, 1995

Related U.S. Application Data

[63] Continuation of Ser. No. 246,382, May 20, 1994, Pat. No. 5,410,140, which is a continuation of Ser. No. 73,995, Jun. 9, 1993, abandoned, which is a continuation of Ser. No. 787,458, Nov. 4, 1991, abandoned, which is a continuation-in-part of Ser. No. 699,417, May 13, 1991, Pat. No. 5,191,197, which is a continuation-in-part of Ser. No. 193,265, May 11, 1988, Pat. No. 5,144,120.

[51] Int. Cl.$^6$ .................................................. G06K 7/10
[52] U.S. Cl. ................................................................ 235/472
[58] Field of Search ...................................... 235/462, 472

[56] References Cited

U.S. PATENT DOCUMENTS

| | | |
|---|---|---|
| 1,438,974 | 12/1922 | Wente . |
| 1,980,888 | 11/1934 | Thomas . |
| 2,920,529 | 1/1960 | Blythe . |
| 3,508,814 | 4/1970 | Aas . |
| 3,532,408 | 10/1970 | Dostal . |
| 3,544,201 | 12/1970 | Fowler et al. . |
| 3,612,642 | 10/1971 | Dostal . |
| 3,614,677 | 10/1971 | Wilfinger . |
| 3,700,304 | 10/1972 | Dostal et al. . |
| 3,758,199 | 9/1973 | Thaxter . |
| 3,794,410 | 2/1974 | Elliott . |
| 3,902,783 | 9/1975 | Bodlaj . |
| 3,978,318 | 8/1976 | Romeo et al. . |
| 3,981,566 | 9/1976 | Frank et al. . |
| 3,998,092 | 12/1976 | Macabee . |
| 4,025,203 | 5/1977 | Lee . |
| 4,170,397 | 10/1979 | Botcherby et al. . |
| 4,436,364 | 3/1984 | Lauer et al. . |
| 4,577,131 | 3/1986 | Soobitsky . |
| 4,708,420 | 11/1987 | Liddiard . |
| 4,775,815 | 10/1988 | Heinz . |
| 4,778,233 | 10/1988 | Christenson et al. . |
| 4,784,448 | 11/1988 | Sepp et al. . |
| 4,902,083 | 2/1990 | Wells . |
| 5,115,120 | 5/1992 | Eastman ................................... 235/472 |
| 5,144,120 | 9/1992 | Krichever et al. . |
| 5,191,197 | 3/1993 | Metlitsky et al. . |
| 5,305,181 | 4/1994 | Schultz . |
| 5,410,140 | 4/1995 | Bard et al. ............................... 235/462 |

FOREIGN PATENT DOCUMENTS

| | | | |
|---|---|---|---|
| 1-306975 | 12/1989 | Japan | ..................................... 235/462 |
| 1387091 | 3/1975 | United Kingdom | ................... 235/462 |

*Primary Examiner*—John Shepperd
*Attorney, Agent, or Firm*—Lowe, Price, LeBlanc & Becker

[57] ABSTRACT

A system for reading indicia having parts of different light reflectivity, includes a light emitter and optical detector supported by a ring to be worn on a finger of a user. The light emitter generates a scanning light beam which scans the indicia and produces reflected light of variable intensity reflected from the indicia. The optical detector detects the reflected light and produces an electrical signal indicative of the reflected light intensity. The ring is worn in a position such that a light beam emitted by the light emitter is directed away from the user.

37 Claims, 3 Drawing Sheets

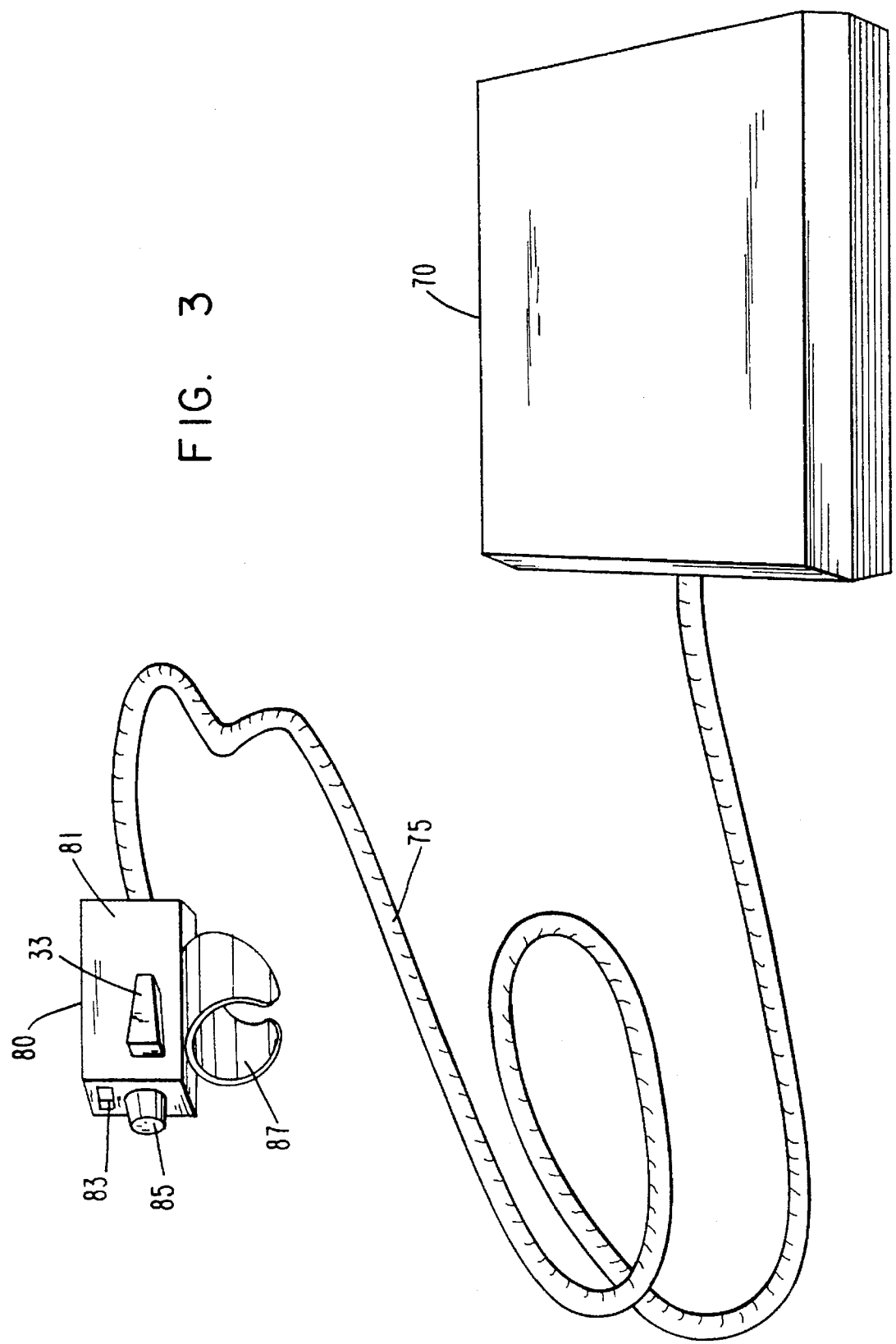

RING MOUNTED MINIATURE OPTICAL SCANNER

CROSS REFERENCE TO RELATED APPLICATIONS

This application is a continuation of application Ser. No. 08/246,382 filed May 20, 1994, now U.S. Pat. No. 5,410,140 which is a continuation of application Ser. No. 08/073,995 filed Jun. 9, 1993 (now abandoned, which is a continuation of application Ser. No. 07/787,458 filed Nov. 4, 1991 (now abandoned), which is a continuation-in-part application Ser. No. 07/699,417 filed May 13, 1991, now U.S. Pat. No. 5,191,197, which is a continuation-in-part of application Ser. No. 07/193,265 filed May 11, 1988, which is now U.S. Pat. No. 5,144,120.

TECHNICAL FIELD

The present invention relates to optical scanners for optically reading information, such as bar codes. In particular, this invention relates to a miniature scanner capable of wearing on a finger as a ring and to a mirrorless beam scanner for use in such a miniature device.

BACKGROUND ART

Optical readers, such as bar code readers, are now quite common. Typically, a bar code comprises a series of encoded symbols, and each symbol consists of a series of light and dark regions, typically in the form of rectangles. The widths of the dark regions, the bars, and/or the widths of the light spaces between the bars indicate the encoded information. A bar code reader illuminates the code and senses light reflected from the code to detect the widths and spacings of the code symbols and derive the encoded data.

Laser scanner systems and components of the type exemplified by U.S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804; 4,816,661; 4,760,248; 4,871,904; 4,806,742; and 4,845,350, as well as U.S. application Ser. Nos. 07/148,669 and 07/147,708—all of said patents and patent applications being owned by the assignee of the instant invention and being incorporated by reference herein—have generally been designed to read indicia having parts of different light reflectivity, e.g., bar code symbols, particularly of the Universal Product Code (UPC) type, at a certain working or reading distance from a handheld or stationary scanner.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. The readers therefore must be easy and convenient to operate.

A variety of scanning devices are known. One particularly advantageous type of reader is an optical scanner which scans a beam of light, such as a laser beam, across the symbols. Typically, a light source such as a laser generates a light beam which is optically modified to form a beam spot of a certain size at the working distance and is directed by optical components along a light path toward a bar code symbol located in the vicinity of the working distance for reflection from the symbol. The scanner includes a detector which senses the light reflected from the symbol and provides an analog scan signal representing the encoded information. A photodetector having a field of view extending across and slightly past the symbol detects light of variable intensity reflected off the symbol and generates electrical signals indicative of the detected light. A scanning component is situated in the light path. The scanning component may either sweep the beam spot across the symbol and trace a scan line across and past the symbol, or scan the field of view of the photodetector, or do both.

A digitizer, associated with or included in the scanner, processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination.

Often the particular application for the bar code reader requires that the optical scanner be constructed in the form of a handheld unit, typically in the form of a pistol. The user points the scanner at the object and operates a trigger to activate the scanning of the bar code. In these handheld units, a light source, such as a visible laser diode (hereinafter VLD) emits a beam of light. To scan the beam across an image, the beam is reflected from a mirror and the mirror is moved in an oscillatory fashion. The oscillation of the mirror causes the reflected beam to scan back and forth in a desired pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

In optical scanners of the type discussed above, the mirror and means to oscillate the mirror add size and weight to the handheld scanner. In applications involving protracted use, a large heavy handheld unit can produce fatigue. Also, a user must pick up and aim the scanner at the object, and this operation may be time consuming, cumbersome and inconvenient. In particular, holding, aiming and activating the scanner ties up one of the user's hands completely so that the user can not concurrently perform other duties. When use of the scanner produces fatigue or is in some way inconvenient, the user is reluctant to operate the scanner, which defeats the data gather purposes for which bar code systems are intended.

In non-laser scanning systems of the type exemplified by U.S. Pat. No. 4,578,571, a non-laser light emitting diode, an optical assembly, a photodetector, and electronic preamplifier/filter circuitry are all fixedly mounted on a common support that is connected to a cantilevered bimorph which is reciprocally driven to jointly move all the aforementioned components back and forth over a bar code symbol to be scanned. The large volume and heavy mass of all the commonly mounted non-laser system components require the expenditure of a great deal of power for the driver. This is not altogether practical in those cases, e.g. battery-powered operation, where power consumption is to be held to a minimum. Also, moving only one or more non-mirrored system components relative to another for conserving power was heretofore not considered desirable, because of optical alignment problems.

The components for the light scanning system, including the light source, optics, photo-detector, scanning component and an electrical conductor, are mounted together in a common assembly to constitute a compact, lightweight, scan module. The scan module is mounted in an interchangeable, modular manner in housings of different configurations. For example, the housing can be hand-held and shaped as a cylinder in a so-called flashlight-type configuration, or shaped as a box, or shaped with a gun-like configuration. The housing can be mounted on the back of an operator's arm (see, for example, U.S. Pat. No. 4,766,299) or on one or more fingers of the operator's hand, typically with the aid of a strap, a clip, or a glove. The housing can be mounted on a countertop workstation. The housing can be mounted in a mobile cart, or shopping cart, or, in some cases, even in a stationary installation.

Commonly assigned application Ser. No. 07/193,265 filed May 11, 1988 which is now U.S. Pat. No. 5,144,120 discloses a mirrorless optical scanner, and application Ser. No. 07/699,417 filed on May 13, 1991 discloses incorporation of such a scanner in a modular scanner component system facilitating use of the scanner in a variety of different housing configurations. One configuration suggested in the application Ser. No. 07/699,417 is a ring mounted housing allowing the user to wear the scanner on a finger.

A need still exists, however, to further reduce the size and weight of the scanner unit and to provide a particularly convenient scanner system which is comfortable to use and does not excessively encumber the user's hand.

DISCLOSURE OF THE INVENTION

Objectives

The objective of this invention is to produce an optical scanning type reader which is more comfortable and convenient to operate and leaves the user's hands free during operation of the scanner.

More specifically, the objective of this invention is to provide a scanner which is smaller and lighter weight, when held by an operator, and which is easier to manipulate to scan encoded data.

To reduce weight and achieve a higher degree of miniaturization, it is a specific object of this invention to eliminate the mirror from the optical scanner.

To further reduce weight and size, it is another object of this invention to provide a particularly small light weight drive for reciprocating one or more of the elements of the mirrorless optical scanner.

Another specific objective is to provide a scanner which can be worn on a finger of the user's hand as a ring. Effectively, aiming such a scanner requires only pointing the finger at the object bearing the encoded information.

A further objective of the invention is to provide a minimum number of scanner system components in the unit worn on a finger and provide the other bulkier components in a separate housing which the user can place at some point which will not encumber the user.

Summary

To provide a reduced size and weight of the optical scanner, the present invention provides a mirrorless beam scanning unit. Rather than use a mirror to produce the beam scanning, this unit actually moves the light emitter or the detector back and forth.

The mirrorless unit therefore comprises a light emitter and means for producing an oscillating movement of the light emitter such that a beam of light from the emitter scans back and forth across an image. In the preferred embodiments, the light emitter is a VLD, and the means for oscillating the light emitter includes a rotatable shaft. The VLD is mounted on the shaft. A lever arm attached to the shaft and an induction motor for moving the arm repeatedly rotate the shaft back and forth through a small rotational arc. In an alternate embodiment, the shaft also supports the detector such that the detector reciprocates back and forth with the VLD.

In a second aspect, the mirrorless optical scanning device comprises a light emitter and means to oscillate the light emitter such that a beam of light from the emitter scans back and forth across an image. Specifically, to produce the oscillation of the emitter, the scanner includes a moveable permanent magnet connected to the light emitter, and an electromagnet. The electromagnet is held in a fixed position in proximity to the moveable permanent magnet. In response to a cyclical electrical signal, the electromagnet produces a magnetic field which acts on the permanent magnet to oscillate the permanent magnet and the attached light emitter back and forth.

In another aspect, the invention is a ring mounted miniature optical scanner. The ring mounted unit includes a base, a photodetector fixedly mounted on the base and an optical emitter mounted on the base for emitting a beam of light. Means are provided to produce a scanning movement of the beam of light from the optical emitter. A finger sized ring attached to the base allows a user to wear the miniature optical scanning system on a finger. In the preferred embodiment of the ring mounted scanner system, the scanner includes the mirrorless beam scanner discussed above.

A separate unit houses the other components of the scanning system, such as the analog signal processing circuitry, digitizer, decoder and any necessary interface to a data processing system. The separate unit can be worn on the user's belt or in a pocket, and a cable connects the separate unit to the ring mounted scanner.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 3 is a pictorial illustration of the scanner unit with its housing and attached ring as connected to the separate unit housing the other components of the scanning system.

BEST MODE FOR CARRYING OUT THE INVENTION

Figure 1:
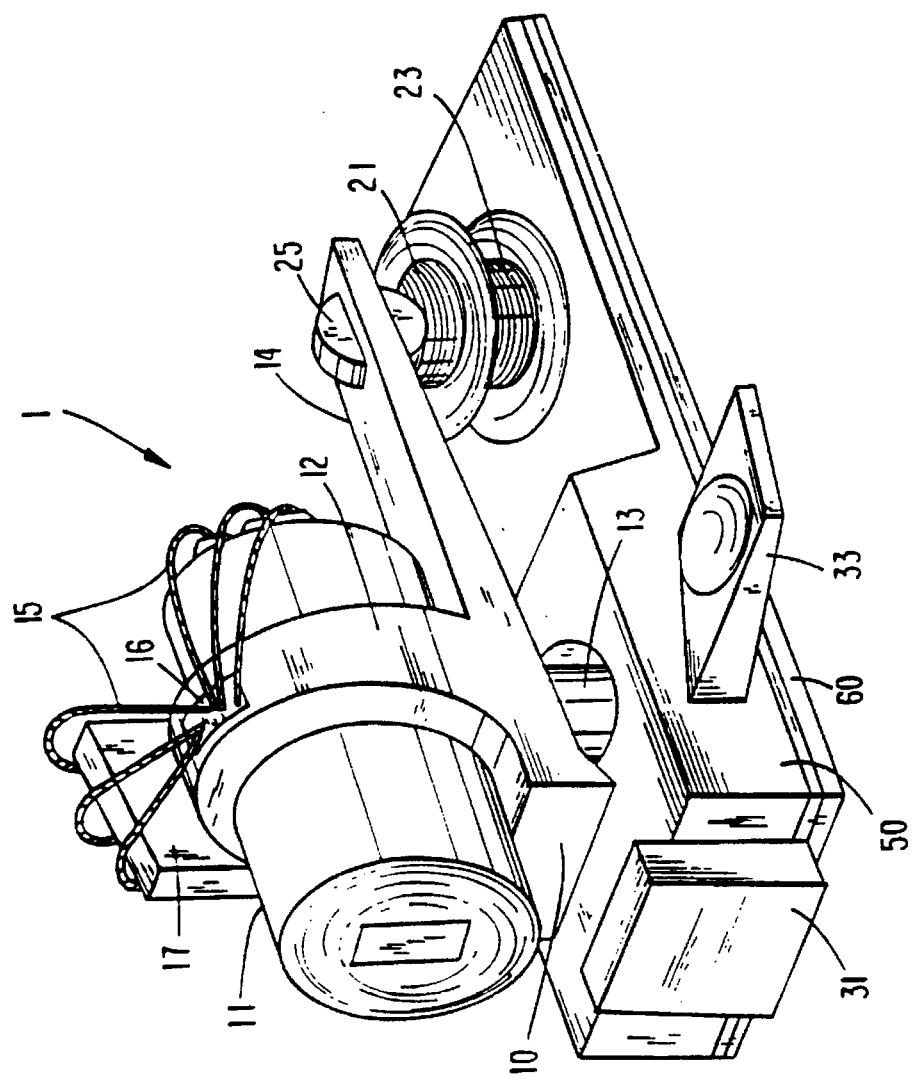
FIG. 1 is an isometric view of a first embodiment of the mirrorless scanner of the present invention, wherein the light emitter reciprocates.

FIG. 1 depicts a mirrorless scanning unit 1 of the present invention. A light emitter, such as a visible laser diode or VLD 11, emits a beam of light to generate a scan line. The VLD 11 may be mounted on the pivotable shaft of a motor or on any material means capable of producing oscillating motion.

In the preferred embodiment of scanning unit 1, the VLD 11 is attached to the top end of a rotatable or pivotable shaft 13. The shaft 13 is pivotably mounted in a scanner base 50. The shaft can be installed either on any known type of bearing or just to rotate in the plastic body of base 50. The VLD 11 and shaft 13 together form a moving assembly 10 for scanning the beam of light from the VLD type light emitter. The moving assembly 10 also includes a collar 12 and a lever arm 14 attached to the shaft 13. A force applied to the end of lever arm 14 produces the oscillatory movement of assembly 10, as will be discussed later.

The collar 12 secures the VLD 11 to the moving assembly 10. In the preferred embodiment, the VLD 11 is secured at a point atop of the shaft 13, such that VLD 11 is effectively located on the pivot axis of the shaft 13 and aligned to emit light in a direction perpendicular to the axis of the shaft. Other arrangements of the VLD and shaft are possible. For example, the VLD could be located at a position offset from the axis. Also, the collar could support the VLD at an angle with respect to the shaft.

Figure 2:
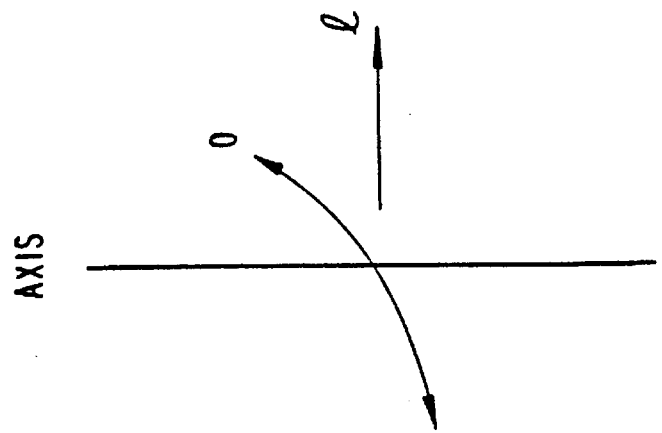
FIG. 2 is a diagram showing the rotational arc of the emitter oscillation and the direction in which light is emitted.

FIG. 2 illustrates the relationship of the motion and light emission of the VLD 11 to the axis of the shaft 13. The short rotational arc o about the shaft axis represents the back and forth pivotal oscillation of the VLD 11. The VLD 11 emits light in direction l toward a targeted object, such as a bar code (not shown). As the VLD 11 of assembly 10 oscillates back and forth through the small rotational arc o, the emitted light l will scan back and forth across the targeted image.

As shown in FIG. 1, three thin wires 15 connect the leads of the VLD 11 on one side to a stationary holder 17 on the other. Alternatively, one flexible cable could be used. In the preferred embodiment, the wires 15 or cable are attached to an intermediate fixing point 16 atop the collar 12. The point 16 is located at the axis of the oscillation of moving assembly 10 and shaft 13 to minimize tension on the lead wires due to the zero linear speed at that point. Alternatively, the wires could be slack and hang loose or be coiled, so long as the wires provide a flexible connection to the oscillating VLD.

A variety of devices can be used to provide the force to oscillate the moving assembly 10 about the axis of shaft 13. In the illustrated embodiment, the oscillation of the assembly is provided by a so-called induced magnetization motor (hereinafter IMM).

The IMM type motor has been disclosed in commonly assigned application Ser. No. 07/520,464, filed on May 8, 1990, entitled SCANNING ARRANGEMENT. In the prior application the IMM oscillated a scanning mirror. The disclosure of this commonly assigned application is herein incorporated by reference. In the IMM type motor, a restoring force is provided by the combination of a fixed position core and coil with a moveable permanent magnet. If the permanent magnet is mounted on the end of a lever arm attached to rotatable shaft, the force takes the form of a torque about the axis of the shaft.

In the present embodiment of the IMM, a core 21 comprises a bobbin around which the coil 23 is wound such that the core and coil are entirely concentric to minimize size and weight. The permanent magnet 25 is rigidly mounted at the end of the lever arm 14 of the moving assembly 10. Location of the permanent magnet 25 at a distance from the axis of the shaft 13 causes the magnetic force applied to the lever arm 14 through the permanent magnet 25 to produce a torque about the axis of the shaft 13.

The core 21 is made of a soft steel to prevent residual magnetization and is magnetically neutral in this case. When there is no current through the coil 23, axially magnetized permanent magnet 25, which is attached to the moving assembly through the lever arm, positions itself above the central axis of the core 21 by the attraction of the magnet 25 to the steel of the core 21. Thus, with no current flowing through coil 23, the moving assembly returns to its rest position at the center of its rotational arc, i.e. facing straight forward.

When a current is introduced through the coil 23, interaction between magnetic fields of the coil and the permanent magnet 25 causes the magnet (with the attached moving assembly) to move from an equilibrium position. As a result of such motion, however, the core becomes increasingly magnetized, thus creating a force (two unlike magnet poles phenomena) which is trying to bring the permanent magnet 25 and the assembly 10 back to the rest position. The magnitude of this force depends on the amount of current through the coil 23, the airgap size between the permanent magnet 25 and a core surface, the size and the material of the core 21, etc. Reversing the polarity of the applied current will reverse the directions of the magnetic forces at work within the IMM. Therefore, if the current applied to the coil takes the form of a cyclical AC signal, such as a sign wave, a pulse signal, a triangular wave, etc., the induced magnetic forces will produce an oscillatory movement of the permanent magnet 25 and the attached moving assembly 10.

Although the IMM is preferred, other arrangements could produce the necessary oscillatory motion. For example, the VLD 11 could be installed on the rotating shaft of a motor. Also, if the IMM is used, other arrangements for mounting the VLD and connecting the moving assembly to the IMM are within the scope of the present invention. For example, in place of the shaft and lever arm arrangement shown in the drawings, the permanent magnet and VLD could both be mounted on a moveable or flexible bridge support directly over the bobbin and coil so that the permanent magnet and VLD oscillate laterally together in response to the cyclical AC signal applied to the coil.

When used as a ring mounted scanner for reading optically encoded information, such as a bar code, the scanner also includes a light detector, such as photodiode 31. As shown in FIG. 1, the front of the scanner base 50 supports photodiode 31 in a position and orientation whereby light from the VLD 11 reflected by a scanned image impinges on the light sensitive area of photodiode 31. The photodiode 31 receives an amount of light reflected back from the target, e.g. a bar code label, and converts that reflected light into an electrical current. A filter, pre-amplification and amplification stages may be provided on a printed circuit board 60 shown attached to the bottom of the scanner base 50. The pre-amplification and amplification stages convert a current from photodiode 31 into an electrical signal to be sent to digitizer and the rest of a processing circuitry contained in the separate unit 70 (see FIG. 3).

A trigger button 33 is mounted on one side of the unit. A user wearing the unit as a ring on one finger, as discussed below, operates button 33 to activate the unit.

As shown in FIG. 3, a hand unit 80 contains the mirrorless scanner within a housing 81. The housing 81 provides a rigid support for the base 50 of scanner 1. The housing 81 includes a rectangular aperture 83 allowing the light beam emitted from the oscillating VLD 11 to pass through to impinge on and scan the target. Reflected light passes through an ambient light blocking optical filter 85 mounted on the front of the housing 81 below aperture 83 and impinges on the photodiode 31. A lens may be included with filter 85 to focus light on the photodiode 31. Although not essential, such a lens does extend the working range of the scanner. The trigger 33 extends through one side of the housing 81. A ring 87 is attached to the bottom of the housing 81 and thereby to base 50 of scanner 1.

The illustrated embodiment is set up for use on a person's right hand. For example, a user puts the ring 87 over the index finger of his or her right hand. To operate the scanner, the user then points the index finger and the hand unit 80 of the scanner at the target and activates switch 33, for example using the thumb of the right hand. To adapt the hand unit 80 for wearing on the left hand requires only placement of the switch 33 on the opposite side.

A long (3-4 feet) flexible multi-wire cable 75 connects the hand unit 80 with the rest of the processing circuitry, consisting of the further amplification stages, digitizer, AC signal generator to drive the IMM, etc. mounted inside a small separate container 70. The separate container 70 also houses the circuitry needed to power the VLD 11 and to provide the AC drive signal for the IMM. In one embodiment, the additional electronics consisted of processing circuitry provided by a circuit board for a standard LS-2000 scanner manufactured by Symbol Technologies, Inc. The container 70 is small enough (2.75"×4"×1.25") to be carried in the pocket, on the belt, etc.

The box 70 can further accommodate a complete decoder with the battery power supply (LS85000 type by Symbol Technologies, Inc.) or even a keyboard (like "JADE") to make a system not only "hands-free" but "location free" as well. Some extra devices can be incorporated in the box 70, for example a memory unit (units), RF (radio frequency) transmitter or the like. This makes the entire device portable and "motion free," such that during scanning the ring mounted scanner unit need not be connected by any physical means to the cash register, computer, etc. which will ultimately process the scanned bar code data.

In an embodiment actually built, the mirrorless scanning unit was only 1" long, by 1.25" high, by 0.625" wide. The exterior dimensions of the housing 81 containing the mirrorless are 1.1" long, by 1.4" high, by 0.7" wide. It takes only 13.5 mA and 3.5 V to operate the mirrorless scanner. Scan angle is ±20°. Unit weight is less than one ounce (27.5 grams). Such a hand unit 80 can easily be worn on a finger like an ordinary ring, leaving the operator's hands (including that finger) absolutely free.

The working range or decode zone can be changed by refocusing the VLD (for the beginning of the working range) and by the installation of a Fresnel lens in front of photodiode or by using a photodiode with a larger sensitivity and active area.

Figure 4:
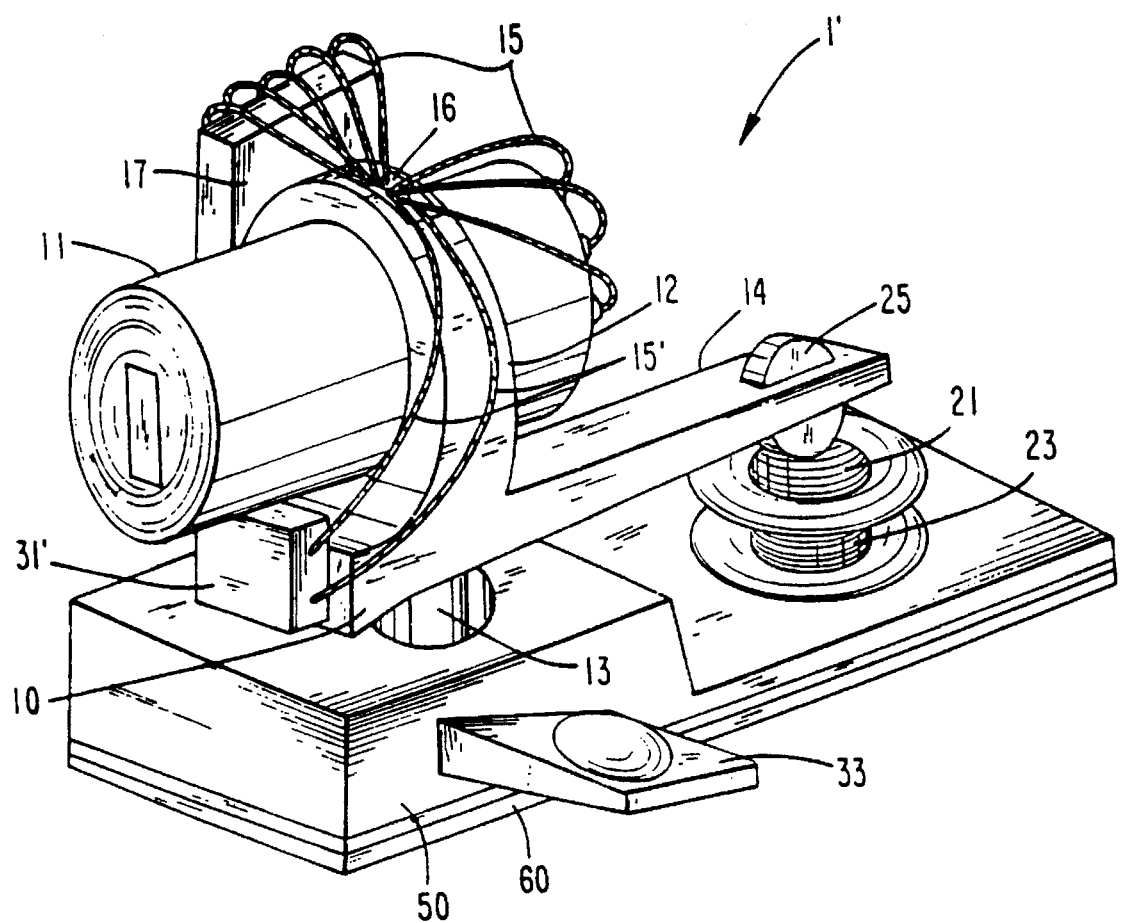
FIG. 4 is an isometric view of a second embodiment of the mirrorless scanner of the present invention, wherein the light detector also reciprocates.

FIG. 4 shows a second embodiment of the mirrorless scanner. The scanner 1' of FIG. 4 is generally similar to the scanner 1 shown in FIG. 1, and like reference numerals indicate corresponding elements of the scanner in each drawing. As shown in FIG. 4, two thin wires 15' connect the leads of the photodiode 31' to the stationary holder 17'. The wires 15' are attached to the intermediate fixing point 16 atop the collar 12 in the same manner as the wires 15 from VLD 11.

In FIG. 4, the photodiode 31' oscillates with the VLD 11. The photodiode 31' is located on the front of the moving assembly 10 directly below the VLD 11. The photodiode 31', like VLD 11, oscillates back and forth through a short rotational arc about the axis of shaft 13. The receptor photodiode 31' therefore closely tracks the motion of the oscillating emitter, VLD 11.

Clearly, the mirrorless scanners of the present invention provides a particularly small, light weight, optical scanner. When mounted on a ring 87 and connected to processing circuitry in a separate unit 70, the scanner can be worn and operated on a user's finger. Aiming the scanner hand unit 80 then requires only pointing the finger at the object bearing the encoded information and activating the switch 33 with the thumb of the same hand. This provides convenient comfortable operation and leaves the user's hands free for other activities.

What is claimed is:

1. A system for reading indicia having parts of different light reflectivity, comprising:

a light emitter for generating a scanning light beam which scans the indicia and for producing reflected light of variable intensity reflected from said indicia;

an optical detector for detecting said reflected light and producing an electrical signal indicative of the reflected light intensity; and means for supporting said light emitter and optical detector on a finger of a user in a position such that the light beam is directed away from the user;

wherein said supporting means is ring shaped.

2. A system according to claim 1, wherein said light emitter includes a laser diode.

3. A system according to claim 1, wherein said light emitter includes an electromagnetic device for moving a light beam so as to produce said scanning light beam.

4. A system according to claim 1, further comprising a signal processor, separate from said supporting means, for processing said electrical signal.

5. A system according to claim 4, further comprising a wire connecting said optical detector to said signal processor.

6. A system according to claim 1, further comprising a switch for activating said light emitter.

7. A system according to claim 1, wherein said supporting means includes a finger sized ring-shaped mounting.

8. A system according to claim 1, wherein said light emitter and optical detector are housed in a first unit mounted to said supporting means and further comprising:

means for analyzing a signal corresponding to said electrical signal;

a second unit separate from said first unit for housing said analyzing means; and means for transmitting the signal corresponding to said electrical signal from said first unit to said second unit.

9. A system according to claim 8, wherein said transmitting means includes a wire connecting said first unit to said second unit.

10. A system according to claim 1, wherein said light beam is directed in the natural pointing direction of the user's finger.

11. A system for reading indicia having parts of different light reflectivity, comprising:

a light emitter for generating a light beam;

an electromagnetic device for moving the light beam to produce a scanning light beam which scans the indicia; and means for supporting said light emitter and said electromagnetic device adapted to be worn on a single finger of a user so as to allow normal movement of said single finger.

12. A system according to claim 11, wherein said light emitter includes a laser diode.

13. A system according to claim 11, wherein said scanning light beam produces reflected light of variable intensity reflected from said indicia and further comprising:

an optical detector for detecting said reflected light and producing an electrical signal indicative of the reflected light intensity; and a signal processor, separate from said supporting means, for processing a signal corresponding to said electrical signal.

14. A system according to claim 13, further comprising:

a first unit for housing said light emitter;

a second unit separated from said first unit for housing said signal processor; and transmitting means for transmitting signals, corresponding to the different light reflectivity of the parts of the indicia, between said first unit and said second unit.

15. A system according to claim 11, wherein said first unit houses said optical detector and said transmitting means includes a wire connecting said first unit to said second unit.

16. A system according to claim 11, further comprising a switch for activating said light emitter.

17. A system according to claim 16, wherein said supporting means is mounted on an index finger of the user and said switch is operable by the thumb of the user.

18. A system according to claim 11, wherein said supporting means includes a ring-shaped mounting and said light beam is directed in the natural pointing direction of the user's finger.

19. A system for reading encoded indicia having parts of different light reflectivity, comprising:

a finger sized ring;

a first unit mounted on the ring, the first unit including a light emitter and an electromagnetically activated beam scanner for producing a scanning light beam to scan the encoded indicia; and an optical detector for detecting the reflected light from the indicia and producing an electrical signal indicative of the reflected light intensity.

20. A system according to claim 19, wherein said light emitter includes a laser diode.

21. A system according to claim 19, further comprising a signal processor for processing a signal corresponding to said electrical signal.

22. A system according to claim 21, further comprising:

a second unit separated from said first unit for housing said signal processor; and transmitting means for transmitting signals corresponding to the reflected light intensity between said first unit and said second unit.

23. A system according to claim 22, wherein said first unit houses said optical detector and said transmitting means includes a wire connecting said first unit to said second unit.

24. A system according to claim 19, further comprising a switch for activating said light emitter.

25. A system according to claim 24, wherein said finger sized ring is mounted on an index finger of a user and said switch is operable by the thumb of the user.

26. A system according to claim 19, wherein said light beam is directed in the natural pointing direction of the user's finger.

27. A system for reading optically encoded indicia having parts of different light reflectivity, comprising:

a finger sized ring;

a first unit mounted on the ring, the first unit including:
  (i) a light emitter and a beam scanner for producing a scanning light beam to scan the encoded indicia, and
  (ii) an optical detector for detecting reflected light from the indicia and producing an electrical signal indicative of the reflected light intensity; and a second unit, spaced apart from said first unit and adapted to be worn by a user, and including circuitry for processing a signal corresponding to the electrical signal; and an electrical conductor connecting the first unit to the second unit.

28. A system for according to claim 27, wherein said beam scanner includes an electromagnetically activated device for producing the scanning light beam.

29. A system according to claim 27, wherein said light emitter includes a laser diode.

30. A system according to claim 27, further comprising:

transmitting means for transmitting signals corresponding to the reflected light intensity between said first unit and said second unit over said electrical conductor.

31. A system according to claim 27, further comprising a switch for activating said light emitter.

32. A system according to claim 31, wherein said finger sized ring is mounted on an index finger of a user and said switch is operable by the thumb of the user.

33. A system according to claim 27, wherein said light beam is directed in the natural pointing direction of a user's finger.

34. In a system for reading indicia having parts of different light reflectivity by directing light toward the indicia and by collecting reflected light returning from the indicia, the arrangement comprising:

a light scanner for generating a scanning light beam which scans the indicia and for producing reflected light of variable intensity reflected from said indicia; and a ring for supporting said light scanner on a single finger of a user.

35. A system for according to claim 34, wherein said light scanner includes a light emitter for emitting a light beam and an electromagnetically activated device for moving the light beam to generate the scanning light beam.

36. In a system for reading indicia having parts of different light reflectivity by directing light toward the indicia and by collecting reflected light returning from the indicia, the arrangement comprising:

a finger sized ring; and a light emitter and electromagnetically activated beam scanner supported on the ring for producing a scanning light beam to scan the indicia.

37. A system according to claim 36, further comprising a switch for activating said light emitter and wherein said finger sized ring is mounted on an index finger of a user and said switch is operable by the thumb of the user.

* * * * *